United States Patent Office 3,062,823
Patented Nov. 6, 1962

3,062,823
METHOD FOR MAKING ORGANOBORON COMPOUNDS
Allen L. McCloskey, Orange, Robert J. Brotherton, Fullerton, and Lowell L. Petterson, Whittier, Calif., assignors to United States Borax & Chemical Corporation, Los Angeles, Calif., a corporation of Nevada
No Drawing. Filed Apr. 27, 1959, Ser. No. 808,907
11 Claims. (Cl. 260—289)

This invention relates as indicated to the preparation of organoboron compounds and has more particular reference to the production of organoboron compounds having boron-boron bonds.

The syntheses of organic compounds having boron-boron bonds have in the past been costly, slow and particularly have resulted in low yields and in questionable end products.

It is therefore the principal object of this invention to provide a new method for producing boron-boron systems.

A further object is to provide a method for producing diboron materials which is economical, efficient and results in high yields.

A still further object is to provide a method for making tetraalkoxydiborons, tetraaryloxydiborons and polymers from such materials.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the ways in which the principle of the invention may be employed.

Broadly stated, the present invention comprises the method of producing compounds having boron-boron bonds according to the general reaction $$B_2(NR_2)_4 + 4R'OH \rightarrow B_2(OR')_4 + 4R_2NH$$

wherein $B_2(NR_2)_4$ is a material selected from the class consisting of tetraalkylaminodiborons and tetraarylaminodiborons derived from primary and secondary amines, R'OH is a material selected from the class consisting of alcohols, phenols and 8-hydroxyquinoline and said reactants are present in substantially stoichiometric amounts.

Referring to the tetraalkylaminodiborons and tetraarylaminodiborons in the above broadly stated paragraph, the amino groups can be derived from primary and secondary aliphatic or aromatic amines. The following list is a partial enumeration of such materials which are applicable to this invention:

Tetra(methylamino)diboron
Tetra(ethylamino)diboron
Tetra(isopropylamino)diboron
Tetra(n-hexylamino)diboron
Tetra(dimethylamino)diboron
Tetra(diethylamino)diboron
Tetra(diisopropylamino)diboron
Tetra(di-n-hexylamino)diboron
Tetra(anilino)diboron
Tetra(p-toluidino)diboron
Tetra(1-naphthylamino)diboron
Tetra(diphenylamino)diboron In the preferred embodiment of our invention, because of cost and availability we use tetraalkylaminodiborons, the amino group of which is derived from secondary alkyl amines wherein the alkyl groups have from 1–6 carbon atoms.

As for the other reactant in the above broadly stated paragraph, this can be any primary, secondary or tertiary alcohol, phenol or 8-hydroxyquinoline. It is to be understood that phenol as used in the present invention is meant to include condensed ring phenols as well as mononuclear phenols. Thus the following list illustrates various compounds applicable to the present invention:

Alcohols—
  Methanol
  Ethanol
  n-Propyl alcohol
  Isopropyl alcohol
  n-Butyl alcohol
  Isobutyl alcohol
  sec-Butyl alcohol
  tert-Butyl alcohol
  All pentyl alcohols
  All hexyl alcohols
  All heptyl alcohols
  All octyl alcohols Phenols—
  Phenol
  Cresols
  Xylenols
  Mesitol
  Catechol
  α Naphthol
  8-hydroxyquinoline We have found that the yields obtained from the foregoing disclosed general reaction can be greatly increased, the reactions can be brought to completion in much shorter time, and the reactions can be conducted at substantially lower temperatures by the addition of an anhydrous hydrogen halide, such as HCl, HBr or HF. We have found that the addition of one of the foregoing anhydrous hydrogen halides weakens the bond between boron and nitrogen and thus makes it easier for the hydroxyl radical to replace the amine radical. This reaction can be illustrated as follows:

$$B_2(NR_2)_4 + 4R'OH + 4HX \rightarrow B_2(OR')_4 + 4R_2NH \cdot HX$$

wherein $B_2(NR_2)_4$ and R'OH are as defined above and HX is an anhydrous hydrogen halide selected from the group consisting of HCl, HBr and HF.

It is important at this point to also note the fact that the present reactants are used in substantially stoichiometric amounts. By this we mean that while the exact molar ratios do not have to be maintained, only a slight excess or slight deficiency of any of the ingredients should be used. An excess of alcohol, etc., or hydrogen halide will cause cleavage of the boron-boron bond, and the greater the excess the greater is the cleavage and consequent lowering of the yield of the desired product. Conversely, a deficiency of the correct amount of ingredients results in the reaction not going to completion. Thus in the preferred embodiment of our invention we use substantially one mole of $B_2(NR_2)_4$ to substantially 4 moles of R'OH and 4 moles of HX.

The diboron compounds of the present reaction $[(RO)_4B_2]$ when heated will produce boron-boron bonded polymeric materials wherein the recurring unit is $(BOR)_x$. Depending on the temperature and length of time of heating polymeric materials having at least five boron-boron bonds can be produced. For example, when tetraethoxydiboron was heated for about six hours at 50–100° C. a polymeric material having about ten boron-boron linkages was produced. This formation of polymeric materials can be illustrated as follows:

$$(RO)_4B_2 \xrightarrow{\Delta} B(OR)_3 + (BOR)_x$$

So that the present invention can be more clearly understood, the following examples are given:

I

Tetra(dimethylamino)diboron, 4.27 g. (21.6 mmoles)

was added to a solution of 3.97 g. (86.4 mmoles) of absolute ethanol in 25 ml. of hexane. The reaction mixture was warmed to 40–50° C. with vigorous stirring and the resulting dimethylamine was swept into a solution of 0.5 N. hydrochloric acid with a dry nitrogen stream. When substantially all of the dimethylamine was evolved (about 135 hours) and recovered the hexane was removed by distillation at reduced pressure. The residue was then distilled rapidly at about 43–53° C./2 mm.

The distillate obtained comprising an admixture of ethyl borate and tetraethoxydiboron was then slowly vacuum fractionated at room temperature and $10^{-6}$ mm. to give pure tetraethoxydiboron, having a B.P. 20–21° C./0.1–0.2 mm., $n_D^{24}$=1.3960.

*Analysis.*—Calculated for $B_2(OEt)_4$: B, 10.70%; C, 47.60%; H, 9.99%. Found: B, 10.50%; C, 47.56%; H, 9.91%.

A cryoscopic molecular weight determination in benzene in a dry nitrogen atmosphere gave a molecular weight substantially the same as the calculated molecular weight, 201.7.

The above tetraethoxydiboron when heated at about 50° C. for about 6 hours formed a polymeric viscous yellow liquid, which on continued heating at about 100° C. became a solid.

II

Tetra(dimethylamino)diboron, 4.2058 g. (21.27 mmoles) was cooled to −80° C. and 5 ml. (85.8 mmoles) of ethanol was added. To this mixture was added with vigorous stirring 29.8 ml. (85.08 mmoles) of a previously prepared solution of hydrogen chloride in diethyl ether. The stirring was continued for about one hour, after which time the mixture solidified. The mixture was slowly warmed to 0° C. and stirred for about another hour, at which time the reaction mass was filtered. Substantially all of the dimethylamine was precipitated as dimethylamine hydrochloride at the end of this time. Attention is directed to Example I where it took about 135 hours to evolve the dimethylamine, whereas the presence of the HCl in the present example caused the dimethylamine to substantially completely precipitate as its hydrochloride in about one hour at 0° C.

The pure tetraethoxydiboron was obtained by vacuum fractionation (of the filtrate) as in Example I.

III

The reaction of tetra(dimethylamino)diboron with methanol in a 1 to 4 molar ratio was carried out as described above in the presence of 4 moles of anhydrous hydrogen bromide. The reaction mass was maintained at −80° C. for one hour and the resulting solid was filtered. The filtrate was distilled as above in Examples I and II. The resultant product was substantially pure tetramethoxydiboron.

IV

A diethyl ether solution of 4.00 g. (20.21 mmoles) of tetra(dimethylamino)diboron and 4.85 g. (80.84 mmoles) of isopropyl alcohol was cooled to −85° C. and 80.84 mmoles of anhydrous hydrogen chloride in 37.6 ml. of diethyl ether solution was added over a 15 minute period. Solids formed and the resulting slurry was stirred for about another 45 minutes. The mixture was warmed to 0° C., stirred for about an hour, and the solids were then removed by filtration. The solvent was removed from the filtrate by rapid distillation at 2 mm. to give a 71.6% yield of residual tetraisopropoxydiboron, $n_D^{25}$ 1.3970.

*Analysis.*—Calculated for $C_{12}H_{28}O_4B_2$: B, 8.39%; mol. wt., 258.0. Found: B, 8.22%; mol. wt., 261.5.

V

A solution of 0.46 g. (2.32 mmoles) of tetra(dimethylamino)diboron and 1.35 g. (0.31 mmoles) of 8-hydroxyquinoline in 30 ml. of benzene was heated to 75–80° C. The resulting dimethylamine was swept into standard HCl with a stream of dry nitrogen. About 93% of the theoretical amine was removed in about 6 hours, and during this time the reaction mass changed from a yellow solution to an orange-brown solid-liquid mixture. The mixture was cooled and filtered. The resultant orange solid on analysis proved to be tetra(quinolin-8-oxy)diboron, $C_{36}H_{24}O_4N_4B_2$.

VI

A solution of 6.14 g. (63.0 mmoles) of phenol and 3.23 g. (16.0 mmoles) of tetra(dimethylamino)diboron in 75 ml. of toluene was heated to 100° C. and the resulting dimethylamine was swept into standard HCl with a stream of dry nitrogen. Substantially all of the dimethylamine was evolved after about 6 hours. The solvent was distilled under vaccum leaving a brownish oil. Treatment of the brown oil with petroleum ether (B.P. 20–40° C.) resulted in tetraphenoxydiboron.

From the foregoing it will be seen that we have provided a method for the preparation of organoboron compounds having boron-boron bonds and which compounds can be disproportionated to produce polymeric boranes wherein the recurring unit is $(BOR)_x$. The tetraalkoxydiborons and tetraaryloxydiborons additionally will be found to have use as herbicides and intermediates in chemical syntheses.

Other modes of applying the principle of the invention may be employed provided the features stated in any of the following claims or the equivalent of such be employed.

We, therefore, particularly point out and claim as our invention:

1. The method of producing tetraorganooxydiboron compounds which comprises reacting the material selected from the class consisting of tetraalkylaminodiborons and tetraarylaminodiborons with a material selected from the class consisting of alkanols, mononuclear phenols, naphthol, and 8-hydroxy-quinoline, said reactants being present in substantially stoichiometric amounts.

2. The method of claim 1 where said reaction takes place in the presence of a material selected from the group consisting of anhydrous HCl, HBr and HF, said material being present in substantially stoichiometric amount.

3. The method of producing tetraethoxydiboron which comprises reacting substantially stoichiometric amounts of tetra(dimethylamino)diboron and ethanol and separating the tetraethoxydiboron from the resultant reaction mass by distillation.

4. The method of producing tetraethoxydiboron which comprises reacting substantially stoichiometric amounts of tetra(dimethylamino)diboron, ethanol and anhydrous hydrogen chloride and separating the tetraethoxydiboron from the resultant reaction mass by distillation.

5. The method of producing tetramethoxydiboron which comprises reacting substantially stoichiometric amounts of tetra(dimethylamino)diboron, methanol and anhydrous hydrogen bromide and separating the tetramethoxydiboron from the resultant reaction mass by distillation.

6. The method of producing tetraisopropoxydiboron which comprises reacting substantially stoichiometric amounts of tetra(dimethylamino)diboron, isopropanol and anhydrous hydrogen chloride and separating tetraisopropoxydiboron from the resultant reaction mass.

7. The method of producing tetra(quinolin-8-oxy)diboron which comprises reacting substantially stoichiometric amounts of tetra(dimethylamino)diboron and 8-hydroxyquinoline and separating the tetra(quinolin-8-oxy)diboron from the resultant reaction mass by filtration.

8. The method of producing tetraphenoxydiboron which comprises reacting substantially stoichiometric amounts of tetra(dimethylamino)diboron and phenol and separating the tetraphenoxydiboron from the resultant reaction mass.

9. Tetra(quinolin-8-oxy)diboron.
10. Tetraphenoxydiboron.

11. A new compound having boron-boron bonds and having the general formula $B_2R_4$ where R is a material selected from the group consisting of phenoxy radicals and quinolin-8-oxy radicals.

No references cited.

UNITED STATES PATENT OFFICE
CERTIFICATE OF CORRECTION

Patent No. 3,062,823 November 6, 1962

Allen L. McCloskey et al.

It is hereby certified that error appears in the above numbered patent requiring correction and that the said Letters Patent should read as corrected below.

Column 3, line 74, for "(0.31 mmoles)" read -- (9.31 mmoles) --.

Signed and sealed this 9th day of April 1963.

(SEAL)
Attest:
ESTON G. JOHNSON
Attesting Officer

DAVID L. LADD
Commissioner of Patents